United States Patent
Kim et al.

(10) Patent No.: US 11,391,467 B2
(45) Date of Patent: Jul. 19, 2022

(54) COOKING APPARATUS

(71) Applicant: Samsung Electronics Co., Ltd, Suwon-si (KR)

(72) Inventors: Kyoung Mok Kim, Suwon-si (KR); Seulkiro Kim, Suwon-si (KR); Sun Hee Park, Suwon-si (KR); Jong Ho Lee, Suwon-si (KR); Jung Soo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 272 days.

(21) Appl. No.: 16/672,372

(22) Filed: Nov. 1, 2019

(65) Prior Publication Data

US 2020/0141589 A1 May 7, 2020

(30) Foreign Application Priority Data

Nov. 1, 2018 (KR) .................. 10-2018-0133069

(51) Int. Cl.
*F24C 15/04* (2006.01)
*C03C 17/34* (2006.01)
(Continued)

(52) U.S. Cl.
CPC .......... *F24C 15/04* (2013.01); *C03C 17/3417* (2013.01); *C03C 17/3435* (2013.01); *C03C 17/3618* (2013.01); *C03C 17/3626* (2013.01); *C03C 17/3657* (2013.01); *C03C 17/3686* (2013.01); *F24C 15/005* (2013.01);
(Continued)

(58) Field of Classification Search
CPC ........ G02F 1/0147; E06B 9/24; E06B 3/6715; E06B 3/6722; F24C 15/02; F24C 15/021; F24C 15/005; F24C 15/04; F24C 15/045; B32B 17/10–1099; C03C 17/34
See application file for complete search history.

(56) References Cited

U.S. PATENT DOCUMENTS

| | | | | |
|---|---|---|---|---|
| 4,583,815 A | * | 4/1986 | Taga .................. | C03C 17/3417 359/359 |
| 5,499,597 A | * | 3/1996 | Kronberg ............... | G01K 11/14 374/E11.02 |

(Continued)

FOREIGN PATENT DOCUMENTS

| | | | | |
|---|---|---|---|---|
| EP | 1182405 A1 | 2/2002 | | |
| JP | 2006256902 A | * 9/2006 | ....... | B32B 17/10036 |

(Continued)

OTHER PUBLICATIONS

International Search Report in connection with International Application No. PCT/KR2019/012531 dated Jan. 16, 2020, 4 pages.

(Continued)

*Primary Examiner* — Z. Jim Yang

(57) ABSTRACT

A cooking apparatus capable of satisfying a heat reflection function while securing a transmittance by applying a variable layer to a glass sheet forming a door includes a cooking chamber, and a door configured to open and close the cooking chamber and provided with a plurality of glass sheets, the door including a variable layer provided on at least one of the plurality of glass sheets and a visible light transmittance variable depending on a temperature.

14 Claims, 14 Drawing Sheets

(51) Int. Cl.
  C03C 17/36 (2006.01)
  G02F 1/01 (2006.01)
  F24C 15/00 (2006.01)
  G02F 1/1503 (2019.01)
  G02F 1/1516 (2019.01)
  G02F 1/1524 (2019.01)
  G02F 1/15 (2019.01)

(52) U.S. Cl.
  CPC ........ G02F 1/0126 (2013.01); *C03C 17/3644* (2013.01); *C03C 2217/70* (2013.01); *C03C 2218/365* (2013.01); *G02F 1/0147* (2013.01); *G02F 1/15* (2013.01); *G02F 1/1503* (2019.01); *G02F 1/1524* (2019.01); *G02F 1/15165* (2019.01); *G02F 1/15245* (2019.01)

(56) References Cited

U.S. PATENT DOCUMENTS

| | | | | |
|---|---|---|---|---|
| 6,084,702 | A * | 7/2000 | Byker | B32B 17/10908 359/359 |
| 6,500,555 | B1 | 12/2002 | Khaldi | |
| 2001/0023864 | A1* | 9/2001 | Millett | F24C 15/04 126/200 |
| 2002/0043261 | A1* | 4/2002 | Leutner | F24C 15/04 126/388.1 |
| 2003/0113550 | A1* | 6/2003 | Millett | A47F 3/0434 428/689 |
| 2003/0196454 | A1* | 10/2003 | Jin | C03C 17/3417 65/30.11 |
| 2004/0005472 | A1* | 1/2004 | Arnaud | C03C 17/3644 428/433 |
| 2004/0182284 | A1* | 9/2004 | Belykh | C09K 9/00 374/E11.02 |
| 2007/0297944 | A1* | 12/2007 | Wendland | G01J 1/04 257/E27.129 |
| 2010/0309539 | A1* | 12/2010 | Kaye | G02F 1/174 977/773 |
| 2011/0075244 | A1 | 3/2011 | Millett et al. | |
| 2011/0080631 | A1* | 4/2011 | Moon | C03C 17/3417 428/457 |
| 2011/0292488 | A1* | 12/2011 | McCarthy | G02F 1/0147 359/288 |
| 2012/0064265 | A1* | 3/2012 | Suh | C03C 17/3644 428/34 |
| 2012/0263930 | A1* | 10/2012 | Moon | C03C 17/3681 428/432 |
| 2012/0263943 | A1* | 10/2012 | Jung | C03C 17/3689 148/516 |
| 2013/0149441 | A1* | 6/2013 | Choi | C23C 14/08 427/162 |
| 2013/0229702 | A1* | 9/2013 | Broekhuis | G02F 1/0063 359/288 |
| 2013/0286461 | A1* | 10/2013 | Broekhuis | G02F 1/0147 359/288 |
| 2014/0001029 | A1* | 1/2014 | Choi | C03C 17/3423 204/192.1 |
| 2015/0203398 | A1* | 7/2015 | Meyer | C03C 17/3452 428/472 |
| 2015/0301423 | A1* | 10/2015 | Orillard | B32B 17/10201 359/275 |
| 2016/0348420 | A1* | 12/2016 | Veerasamy | G02F 1/163 |
| 2017/0016626 | A1* | 1/2017 | Arteconi | G01K 11/12 |
| 2017/0028686 | A1* | 2/2017 | Wilson | B32B 7/05 |
| 2017/0036946 | A1* | 2/2017 | Celikbilek Ersundu | C03C 3/23 |
| 2017/0290463 | A1* | 10/2017 | Alexander | F24C 15/04 |
| 2018/0216833 | A1* | 8/2018 | Baker | F24C 15/02 |
| 2018/0306648 | A1* | 10/2018 | Park | G01K 11/12 |
| 2018/0328102 | A1* | 11/2018 | Byker | B32B 27/36 |
| 2019/0002328 | A1* | 1/2019 | Lezzi | B32B 17/10761 |
| 2019/0137839 | A1* | 5/2019 | Orillard | C03C 17/3657 |

FOREIGN PATENT DOCUMENTS

| | | |
|---|---|---|
| KR | 20-0229349 Y1 | 7/2001 |
| KR | 10-2010-0119136 A | 11/2010 |
| KR | 10-2012-0001886 A | 1/2012 |
| KR | 10-1678217 B1 | 11/2016 |
| SE | 528976 C2 | 3/2007 |
| WO | 9415785 A1 | 7/1994 |
| WO | 00/77564 A1 | 12/2000 |
| WO | 2006128696 A1 | 12/2006 |
| WO | WO-2008044531 A1 * | 4/2008 ............ C01G 31/02 |

OTHER PUBLICATIONS

European Search Report in connection with European Application No. 19204915.3 dated Mar. 27, 2020, 8 pages.

* cited by examiner

COOKING APPARATUS

CROSS-REFERENCE TO RELATED APPLICATIONS

This application is based on and claims priority under 35 U.S.C. § 119 to Korean Patent Application No. 10-2018-0133069 filed on Nov. 1, 2018 in the Korean Intellectual Property Office, the disclosure of which is incorporated by reference herein in its entirety.

BACKGROUND

1. Field

The disclosure relates to a cooking apparatus.

2. Description of Related Art

A cooking apparatus such as an oven is a device for cooking food by including a heater for applying heat to a cooking chamber and a circulating fan for circulating the heat generated in the heater in the cooking chamber.

The cooking apparatus includes a body in which the cooking chamber into which food to be cooked is put is formed, and a door installed on a front surface of the body to selectively open and close the cooking chamber.

The door is configured to allow a user to see the inside of the cooking chamber and configured to prevent heat inside the cooking chamber from being released to the outside.

SUMMARY

Therefore, it is an aspect of the present disclosure to provide a cooking apparatus capable of satisfying a heat reflection function while securing a transmittance by applying a variable layer to a glass sheet forming a door.

Additional aspects of the present disclosure will be set forth in part in the description which follows and, in part, will be obvious from the description, or may be learned by practice of the present disclosure.

In accordance with an aspect of the disclosure, a cooking apparatus includes a cooking chamber, and a door configured to open and close the cooking chamber and provided with a plurality of glass sheets, and the door includes a variable layer provided on at least one of the plurality of glass sheets and including a visible light transmittance variable depending on a temperature.

The variable layer may include a thermochromic material.

The variable layer may include at least one of $VO_2$, $Ti_2O_3$, $NbO_2$, NiS, or $FeSi_2$.

The variable layer of a first glass sheet of the at least one of the plurality of glass sheets that is nearest to an inside of the cooking chamber may include at least one of $Ti_2O_3$ or $NbO_2$.

The variable layer of a second glass sheet of the at least one of the plurality of glass sheets that is nearest to an outside of the cooking chamber may include $VO_2$.

The door may include a heat reflective coating layer and the variable layer provided on at least one of the plurality of glass sheets.

The variable layer may be provided on a glass sheet farthest from the cooking chamber, among the plurality of glass sheets.

The door may include a heat reflective coating layer provided on at least one of the plurality of glass sheets.

The heat reflective coating layer may include a metal layer configured to increase heat reflectivity; and a dielectric layer configured to prevent oxidation of the metal layer.

The metal layer may include silver; and the dielectric layer may include at least one of SiN or TiN.

The door may include the variable layer provided on an opposite surface of the at least one of the plurality of glass sheet.

The door may include the variable layer and a heat reflective coating layer, which are provided on one surface of at least one of the plurality of glass sheets.

The variable layer may include an electrochromic material.

The electrochromic material may include at least one of $WO_3$, $Nb_2O_5$, $MoO_3$, $TiO_3$, $V_2O_5$, $IrO_2$, NiO, viologen, polypyrrole, PEDOT or polyaniline.

The variable layer may include a photochromic material.

The photochromic material may include at least one of spiropyran, spiroxazine, fulguide, chromene, diazo compounds or diarylethene.

The door may include a temperature sensor configured to measure a temperature of at least one of the plurality of glass sheets including the variable layer, and a signal outputter configured to output a signal varying the variable layer based on a temperature measured by the temperature sensor reaching a predetermined temperature.

The variable layer may include an electrochromic material and a photochromic material.

The output signal may include an electrical signal configured to excite a phase transition of the electrochromic material; and an optical signal configured to excite a phase transition of the photochromic material.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
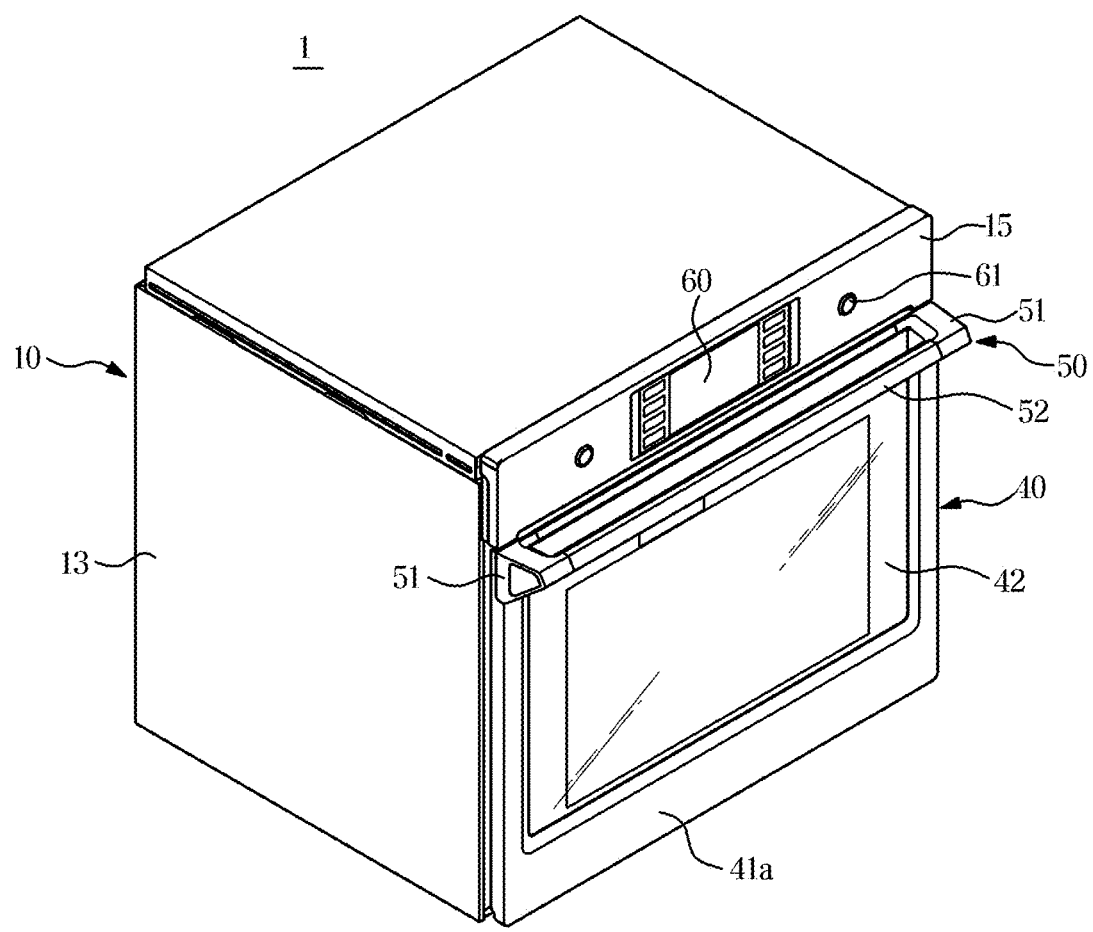
FIG. 1 is a view illustrating an example of a cooking apparatus according to an embodiment of the disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described in the disclosure and configurations shown in the drawings are merely examples of the embodiments of the disclosure, and may be modified in various different ways at the time of filing of the present application to replace the embodiments and drawings of the disclosure.

The terms used herein are used to describe the embodiments and are not intended to limit and/or restrict the disclosure.

The singular forms "a," "an" and "the" are intended to include the plural forms as well, unless the context clearly indicates otherwise.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. In the following description, terms such as "unit", "part", "block", "member", and "module" indicate a unit for processing at least one function or operation. For example, those terms may refer to at least one process processed by at least one hardware such as Field Programmable Gate Array (FPGA), Application Specific Integrated Circuit (ASIC), at least one software stored in a memory or a processor.

The disclosure will be described more fully hereinafter with reference to the accompanying drawings. In addition, the same reference numerals or signs shown in the drawings of the disclosure indicate elements or components performing substantially the same function.

Figure 2:
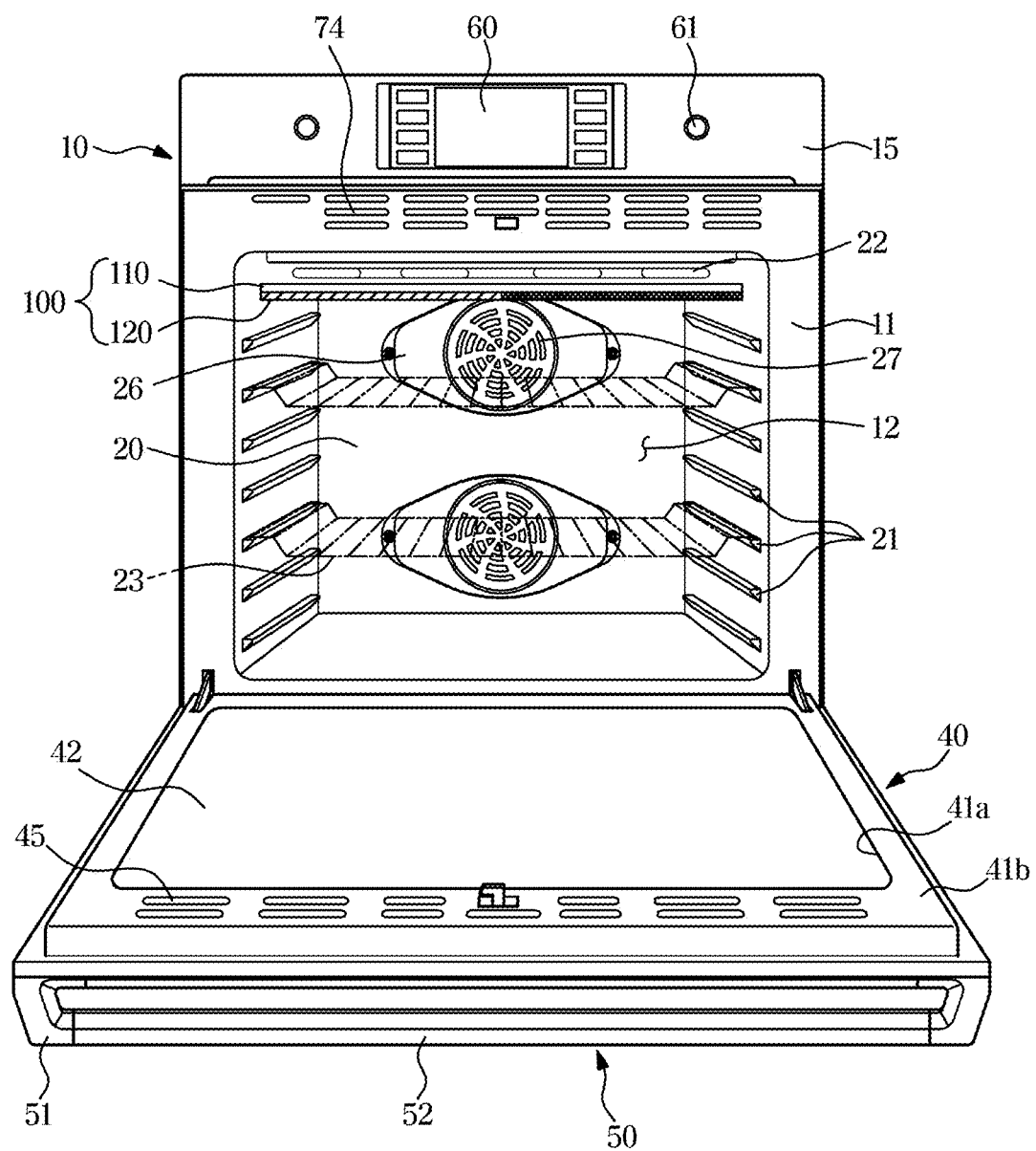
FIG. 2 is a view illustrating the example of the cooking apparatus according to an embodiment of the disclosure.
Figure 3:
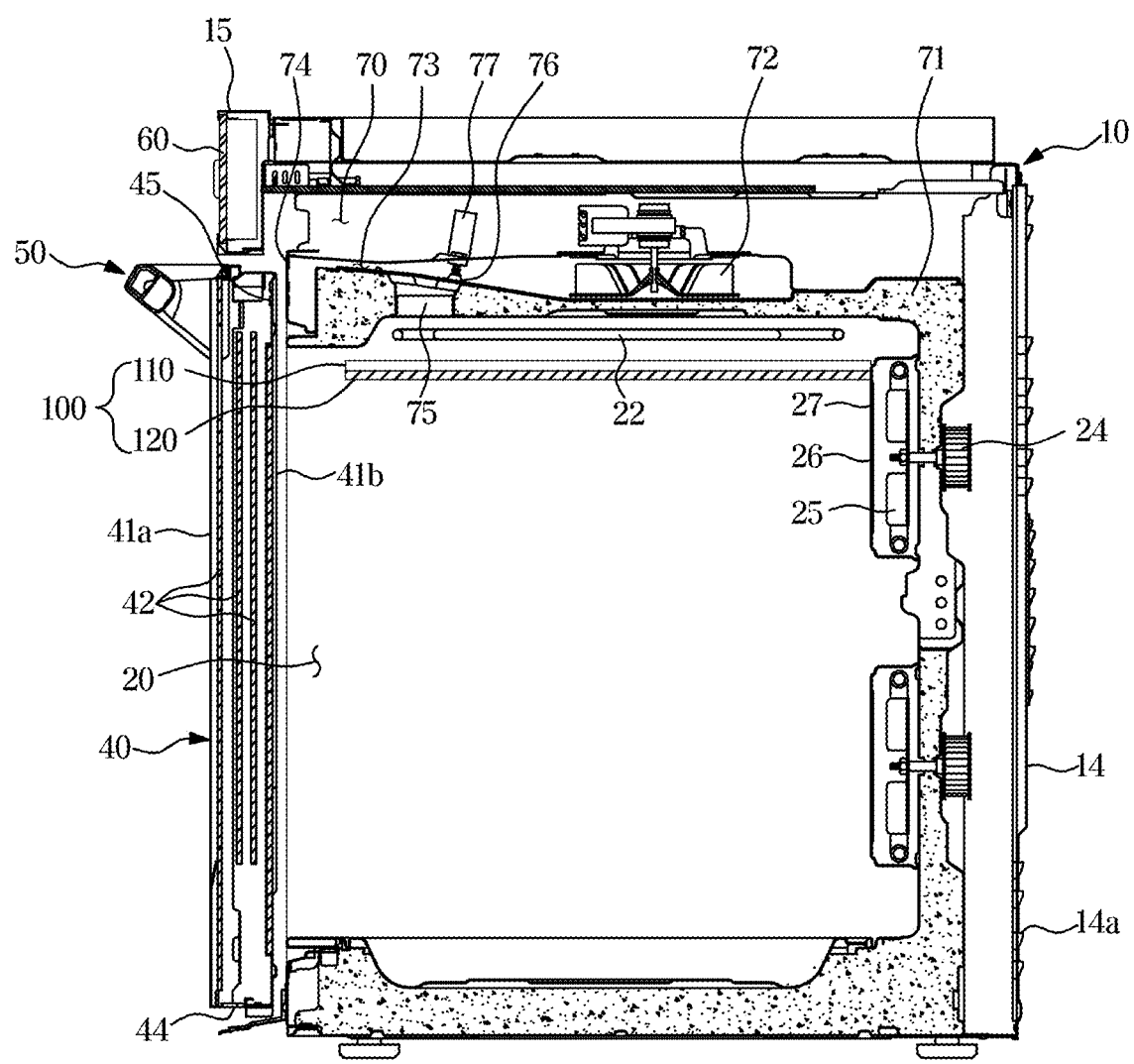
FIG. 3 is a view illustrating the example of the cooking apparatus according to an embodiment of the disclosure.

FIGS. 1 to 3 are views illustrating an example of a cooking apparatus according to an embodiment of the disclosure.

A cooking apparatus 1 according to an embodiment of the disclosure is a concept including a device capable of heating a cooking object to be cooked, and the cooking apparatus 1 may include an oven, a microwave oven, and a far-infrared radiation cooking apparatus. For convenience of description, an oven will be described as an example of the cooking apparatus according to an embodiment.

As illustrated in FIGS. 1 to 3, the cooking apparatus 1 according to an embodiment may include a case 10 and a cooking chamber 20 provided inside the case 10. The case 10 may include a front panel 11 forming a front surface of the case 10, a side panel 13 forming a side surface of the case 10, and a rear panel 14 forming a rear surface of the case 10.

The cooking chamber 20 is provided inside the case 10 in the form of a box and configured to be opened and closed by a door 40. The front panel 11 may include an opening 12 corresponding to the cooking chamber 20 having a front surface opened. The cooking chamber 20 may include a plurality of supports 21 protruding from left and right walls of the cooking chamber. A rack 23 on which a cooking object is placed may be mounted to the plurality of supports 21.

The cooking chamber 20 may be provided with a heater 22 heating the cooking object to be cooked. The heater 22 according to an embodiment may include a heater generating an electromagnetic wave such as far-infrared rays to heat the cooking object to be cooked. For example, the heater 22 according to an embodiment may include an electric heater including an electrical resistor.

A circulation fan 25 allowing the cooking object to be evenly cooked by circulating the air in the cooking chamber 20, and a circulation motor 24 driving the circulation fan 25 may be provided in a rear portion of the cooking chamber 20. A fan cover 26 covering the circulation fan 25 may be provided in front of the circulation fan 25. A through hole 27 is formed in the fan cover 26 to allow air to flow.

The door may be hinged to the lower side of the case 10 so as to be rotatable with respect to the case 10. Alternatively, the door may be hinged to the left or right side of the case 10.

The door may include a transparent material such as a glass 42 that allows a user to confirm a cooking process of the cooking object in the cooking chamber, from the outside. A plurality of the glass sheets 42 may be provided inside the door. The door may include a front door frame 41a and a rear door frame 41b provided to along an edge of the glass sheet. The door may include an air inlet 44 provided at a lower end to allow air to flow into the inside of the door. Outside air flowing from the lower end of the door may be discharged through an air outlet 45 provided in the rear door frame 41b after exchanging heat with the heat transferred from the cooking chamber 20 while moving upward from inside the door. With this configuration, according to an embodiment of the disclosure, it may be possible to cool heat inside the door through the air circulation. Further, a variable layer 100 configured to change a transmittance and heat blocking performance of the glass is applied to the glass of the door according to an embodiment, and a detailed description thereof will be described later. The variable layer 100 can include multiple layers 110 and 120.

The door may include a handle 50 provided at an upper end of the front surface of the door so that the door may be held by the user for opening and closing the door. When the door is hinged to the left or right side of the case 10, the handle 50 may be provided on the right or left side of the front surface of the door in accordance with the position of the door. The handle 50 may protrude forward from the front surface of the door 40 by a predetermined length. That is, the handle 50 may include a pair of handle supports 51 extending forward from the front surface of the door 40 and a handle extension 52 connecting the pair of handle supports 51.

The cooking apparatus 1 may include a display 60 installed on an upper portion of the front panel 11 and configured to display various kinds of operation information of the cooking apparatus 1 and configured to allow a user to input an operation command. Alternatively, the display 60 may be installed on an electronics chamber cover 15. The display 60 may employ a light emitting diode (LED), an organic light emitting diode (OLED), or a liquid crystal display (LCD). Alternatively, the display may employ a touch screen panel (TSP) that receives a control command from a user and displays operation information corresponding to the received control command. The touch screen panel may include a display displaying operation information and a control command that is to be input from a user, a touch panel configured to detect coordinates with which a body part of a user is in contact, and a touch screen controller configured to identify a control command input from a user, based on the touch coordinates detected by the touch panel.

The touch screen controller may recognize the control command input from the user by comparing the touch coordinates of the user detected by the touch panel with the coordinates of the control command displayed on the display.

The cooking apparatus 1 may further include an operator 61 provided on the electronics chamber cover 15 and configured to receive an additional command for an operation of the coking apparatus 1.

The cooking apparatus 1 may include an electronics chamber 70 in which electronic components for controlling the operation of various accessories including the display 60 are placed. The electronics chamber 70 may be provided on the upper portion of the cooking chamber 20. A heat insulating material 71 insulating the electronics chamber 70 and the cooking chamber 20 may be installed between the electronics chamber 70 and the cooking chamber 20 to prevent the heat of the cooking chamber 20 from being transferred to the electronics chamber 70.

In addition to being installed between the electronics chamber 70 and the cooking chamber 20, the heat insulating material 71 may be installed to cover the entire outer side of the cooking chamber 20 so that the heat of the cooking chamber 20 is not transferred to the outside of the cooking apparatus 1.

The cooking apparatus 1 may include a cooling structure for cooling the electronics chamber 70 by circulating air around the cooking chamber 20. The cooling structure of the cooking apparatus 1 may include a cooling fan unit 72 flowing air and a cooling flow path 73 discharging the air sucked by the cooling fan unit 72 to the front of the cooking apparatus 1.

The outside air may be sucked into the electronics chamber 70 through the through hole 14a formed in the rear panel 14, and the air sucked into the electronics chamber 70 may flow inside the electronics chamber 70 to cool the electric component and then the air may be discharged to the front of the cooking apparatus 1 through a discharge port 74 along the cooling flow path 73.

A part of the air in the cooking chamber 20 may be sucked to the cooling flow path 73 side through a discharge flow path 75, and then discharged to the front of the cooking apparatus 1. A bypass hole 76 allowing a part of the air flowing from the cooling flow path 73 to the discharge port 74 to flow into the discharge flow path 75 may be additionally provided. The bypass hole 76 may be opened and closed by an opening and closing device 77 and an amount of air of the cooking chamber 20 to be discharged into the cooling flow path 73 may be regulated by opening and closing the bypass hole 76.

Meanwhile, as described above, the door is composed of a plurality of glass sheets to prevent the heat inside the cooking chamber from being released to the outside. The outer surface of the door is a part in contact with a user, and controls the temperature below a predetermined temperature.

The oven generally includes a pyro cleaning function, which is a pyrolysis cleaning. When this function is performed, the heat transfer to the outer surface of the door is the most frequent, and thus a method for preventing the temperature rise of the door is needed.

However, during cooking, heat insulation performance is used to transfer the heat to the food while preventing the heat generated in the heater inside the cooking chamber from being released to the outside.

There is a trade-off relationship between the cooling effect for lowering the temperature of the door and the heat insulation effect for preventing the heat of the cooking chamber from being released to the outside, and thus it is needed to develop a balanced design of the two conflicting effects and a door including the same.

Heat energy generated in the cooking chamber is transferred to the outside through radiation, conduction, and convection. The conduction and the convection may be minimized through the air flow path described above, and the radiation may be minimized through a heat reflective coating configured to block the radiant heat and applied to at least one glass sheet in the plurality of glass sheets.

In general, as the performance of the heat reflective coating increases, the heat transfer due to the radiant heat may be reduced, and thus the door cooling effect and the cooking chamber insulation effect may be satisfied at the same time.

The heat reflective coating may be classified into a hard coating and a soft coating. Tin oxide ($SnO_2$) is mainly used for the hard coating, and indium doped tin oxide (ITO) or silver (Ag) is used for the soft coating. As for the heat reflective coating, each material has electrical conductivity, and as the higher electrical conductivity, the higher radiant heat blocking effect. Therefore, the soft coating exhibits a higher performance than that of the hard coating.

However, because the heat reflective performance and the visible light transmittance are inversely related to each other in the heat reflective coating, the transmittance of the glass decreases upon applying the heat reflective coating with high performance, and it becomes difficult to confirm the food inside the cooking chamber during the cooking. That is, it is helpful to provide a method capable of omitting a separate structure for cooling at the time of the pyro cleaning by improving the heat reflective performance at the time of pyro cleaning and the method capable of securing the transmittance to allow the inside of the cooking chamber to be confirmed at the time of the cooking In an embodiment, a cooking apparatus capable of improving the heat reflective performance at the time of the pyro cleaning, which uses the most door cooling effect, and capable of securing the visible light transmittance at the time of the cooking, by applying the variable layer 100 as well as the heat reflective coating described above, to the glass, is provided. Hereinafter a door to which the variable layer 100 is applied will be described in detail.

FIGS. 4 to 7 are views illustrating a laminated structure of a door glass to which a variable layer according to an embodiment of the disclosure is applied.

Figure 4:
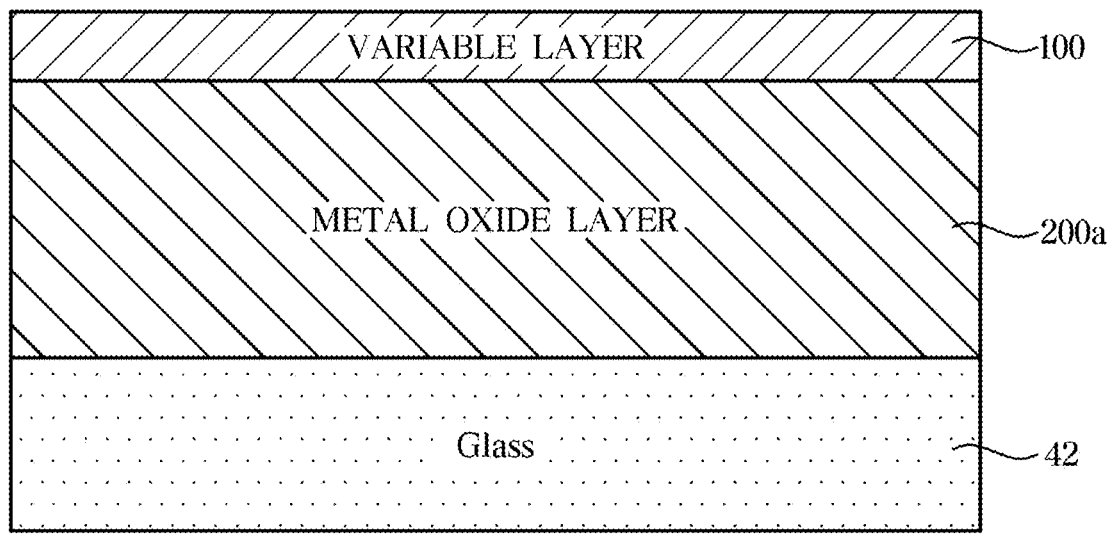
FIG. 4 is a view illustrating a laminated structure of a door glass to which a variable layer according to an embodiment of the disclosure is applied.

As illustrated in FIG. 4, a heat reflective coating layer 200a may be provided on the surface of the glass sheet, and the variable layer 100 according to an embodiment may be provided on the heat reflective coating layer 200a. The heat reflective coating layer 200a illustrated in FIG. 4 may include tin oxide, which is a metal oxide, as the hard coating layer described above.

Figure 5:
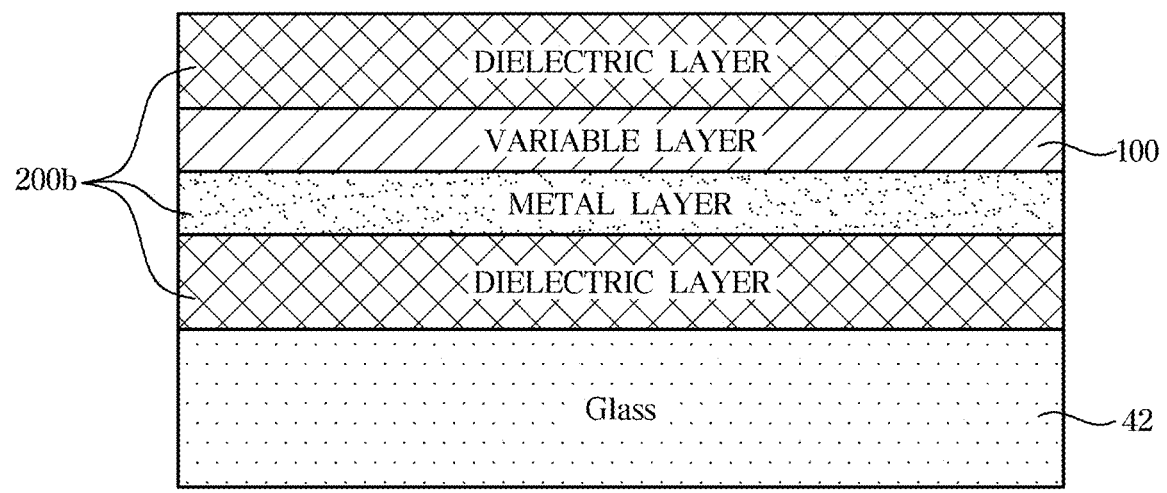
FIG. 5 is a view illustrating a laminated structure of a door glass to which a variable layer according to an embodiment of the disclosure is applied.

Alternatively, as illustrated in FIG. 5, a heat reflective coating layer 200b and a variable layer 100 provided on a silver layer may be provided on the glass sheet, and the heat reflective coating layer 200b has a multilayer structure in which a metal layer such as a silver (Ag) layer implementing the heat reflective performance, and a dielectric layer for the oxidation prevention of the silver layer, increasing adhesion, interference effect, are added. The dielectric layer may include SiN or TiN.

Figure 6:
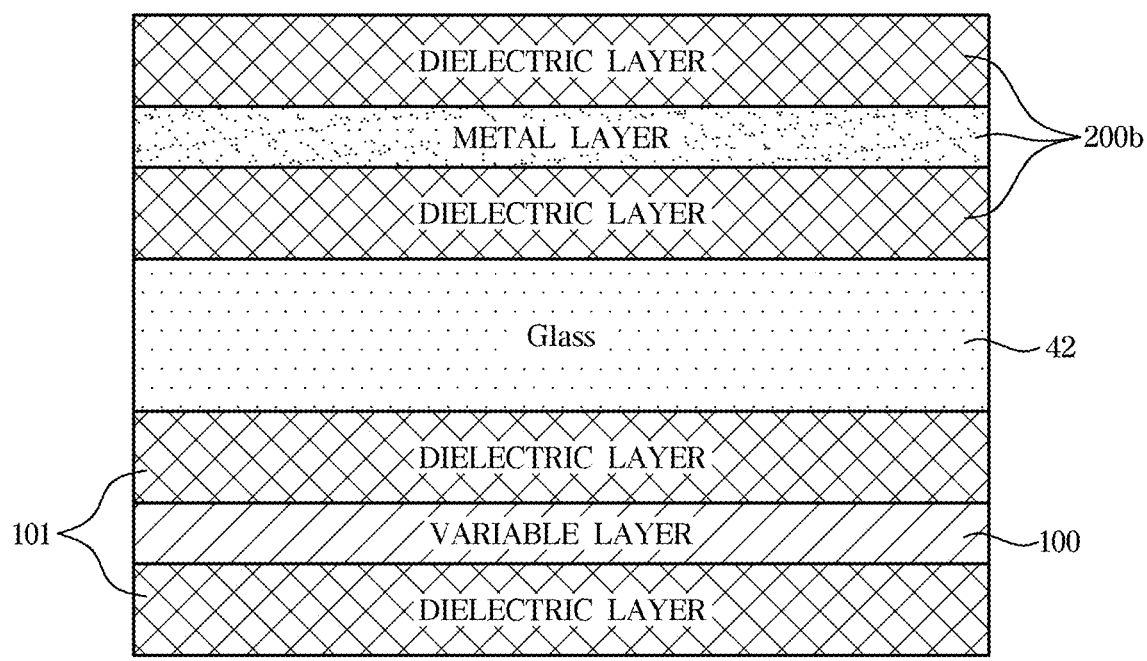
FIG. 6 is a view illustrating a laminated structure of a door glass to which a variable layer according to an embodiment of the disclosure is applied.

Alternatively, as illustrated in FIG. 6, a variable layer 100 may be provided on the opposite side of the surface on which a heat reflective coating layer 200b, which is a soft coating layer, including the metal layer and the dielectric layer 101, is formed. The variable layer 100 may be provided together with the dielectric layer 101 for the oxidation prevention, increasing adhesion, interference effect. The dielectric layer 101 may include SiN or TiN.

Figure 7:
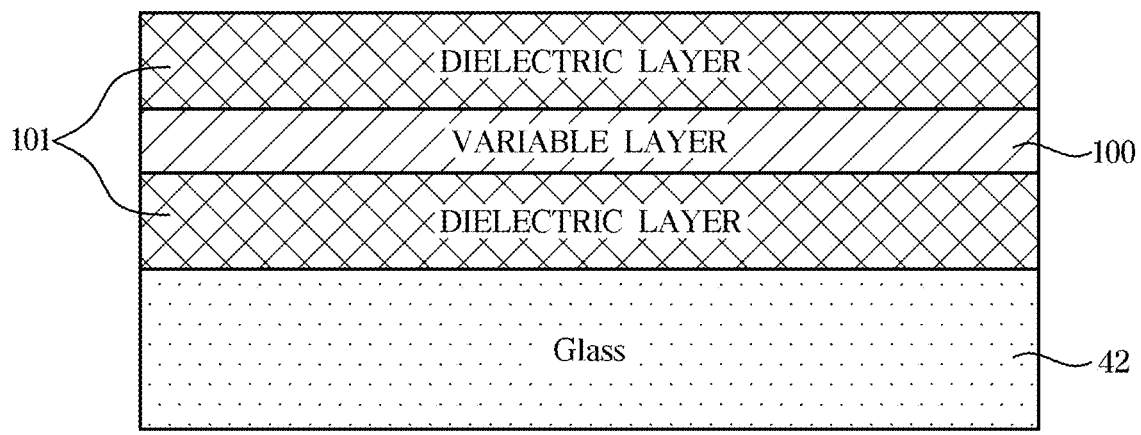
FIG. 7 is a view illustrating a laminated structure of a door glass to which a variable layer according to an embodiment of the disclosure is applied.

Alternatively, as illustrated in FIG. 7, a variable layer 100 may be provided with a dielectric layer 101, without a separate heat reflective coating layer.

That is, as illustrated in FIGS. 4 to 7, the variable layer 100 may be provided together with the heat reflective coating layer on the same side of the glass sheet, or on the opposite side of the side on which the heat reflective coating layer is formed. Alternatively, only the variable layer 100 may be provided without the heat reflective coating layer. As described above, the door includes the plurality of glass sheets. The variable layer 100 may be provided together with the heat reflective coating layer on the same surface of at least one of the plurality of glass sheets, or on the opposite side of the side on which the heat reflective coating layer is formed. Alternatively, only the variable layer 100 may be provided without the heat reflective coating layer.

That is, there is no limitation in the number of the glass sheet in which the variable layer 100 is formed and the combination of the variable layer 100 and the heat reflective coating layer.

On the other hand, a thermochromic material may be used as the variable layer 100. The thermochromic material is a variable material in which a transmittance thereof is changed according to heat. According to an embodiment, the thermochromic material may include a thermochromic material having a phase transition temperature (Tc) in the range of 0 to 500° C. For example, the thermochromic material may include $VO_2$, $Ti_2O_3$, $NbO_2$, NiS, and $FeSi_2$.

As for the above-mentioned thermochromic material, a phase transition may occur at a phase transition temperature, and thus the visible light transmittance and the electric conductivity may be changed. Because the radiant heat blocking effect is changed according to the electric conductivity, the higher electric conductivity, the higher radiant heat blocking effect. The phase transition temperature is a unique value of each material, and adjustment may be achieved in a predetermined level through metal doping for each material.

That is, the thermochromic material may secure the transmittance in a cooking mode and improve the heat reflective performance in a pyro cleaning mode by the electric conductivity and the visible light transmittance which are changed according to the phase transition temperature.

The thermochromic material constituting the variable layer 100 may be changed depending on which of the plurality of glass sheets on which the variable layer 100 is formed. Because the radiant heat inside the cooking chamber is reduced by passing through the plurality of glass sheets constituting the door, a temperature of the radiant heat is higher in a glass sheet close to the inside of the cooking chamber, and a temperature of radiant heat is lower in a glass sheet near the outside.

Therefore, when the variable layer 100 is formed in a glass sheet close to the inside of the cooking chamber, a thermochromic material having a high phase transition temperature such as $Ti_2O_3$ or $NbO_2$ may be used, and when the variable layer 100 is formed in a glass sheet close to the outside, $VO_2$ may be used.

A table 1 below shows the temperature of each glass sheet in the cooking mode and the pyro cleaning mode.

TABLE 1

| Temperature (° C.) | $4_{th}$ glass (42d) | $3_{th}$ glass (42c) | $2_{th}$ glass (42b) | $1^{st}$ glass (42a) | Inside of the cooking chamber |
|---|---|---|---|---|---|
| cooking | 40 | 80 | 150 | 270 | 300 |
| Pyro cleaning | 75 | 150 | 280 | 400 | 450 |

As shown in the table 1, there is a large difference between the glass temperatures of the door during the pyro cleaning and the glass temperatures of the door during the cooking, and the thermochromic material constituting the variable layer 100 may be selected based on this temperature difference.

That is, because it is more important for a user to check the inside of the cooking chamber than the heat reflective performance during the cooking, a relatively high transmittance and low heat reflective performance are used. Because it is important to block the heat and it is not required to check the inside of the cooking chamber during the high temperature-pyro cleaning, a relatively low transmittance and high heat reflective performance are helpful.

Therefore, a thermochromic material may be selected according to the temperature at the time of the cooking and the temperature at the time of the pyro cleaning. A material that secures the visible light transmittance because the phase transition does not occur during the cooking and that increases the heat blocking performance because the phase transition occurs during the pyro cleaning may be selected as the thermochromic material.

For example, when the variable layer 100 is formed on the first glass 42a, a thermochromic material in which the phase transition does not occur at the temperature of 270 degrees corresponding to the temperature of the first glass 42a at the time of the cooking, and the phase transition occurs at the temperature of 400 degrees corresponding to the temperature of the first glass 42a at the time of the pyro cleaning may be selected as the thermochromic material. This criterion may also be applied when the variable layer 100 is applied to another glass sheet. Various embodiments will be described with reference to FIGS. 8 to 12.

FIGS. 8A to 12 are views illustrating a state in which a phase transition occurs in the variable layer 100 according to an embodiment of the disclosure, according to a temperature.

A technical concept of the disclosure will be described with reference to FIGS. 8A and 8B and embodiments of the disclosure will be described with reference to FIGS. 9 to 12.

Figure 8A:
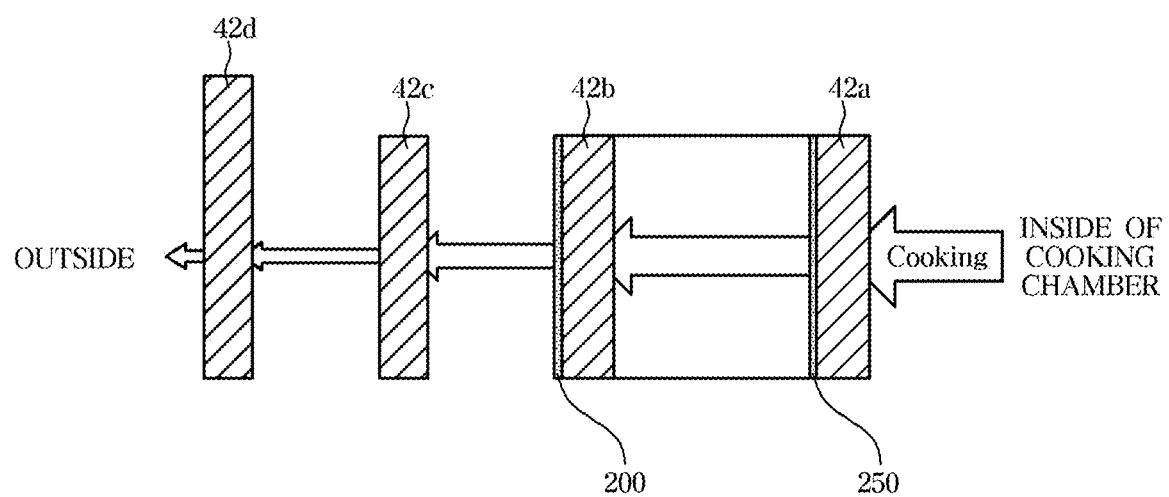
FIGS. 8A and 8B are views illustrating a state in which a phase transition occurs in the variable layer according to an embodiment of the disclosure, according to a temperature.
Figure 8B:
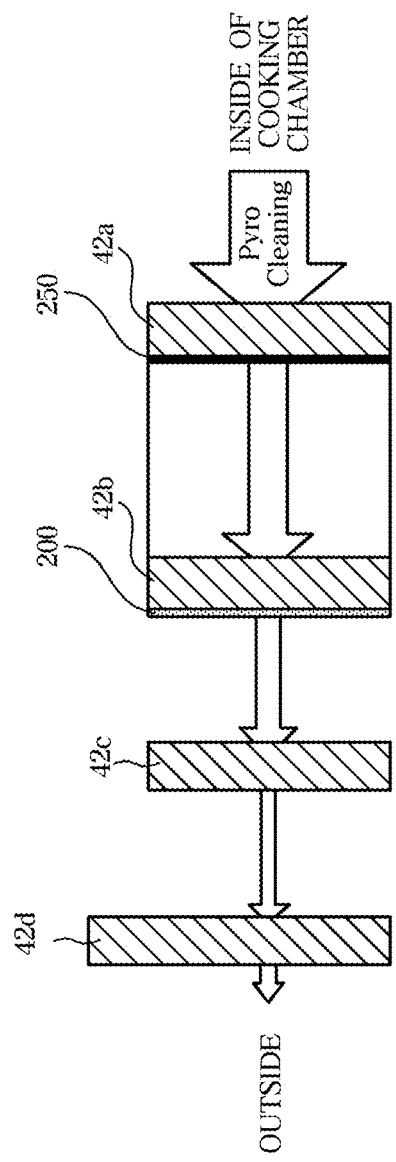

Referring to FIGS. 8A and 8B, a variable heat reflective coating layer 250 including the heat reflective coating layer 200 and the variable layer 100 may be formed on the first glass 42a and only the heat reflective coating layer 200 may be formed on the second glass 42b.

FIG. 8A illustrates the degree of decrease in the radiant heat during the general cooking mode, as a thickness of an arrow, and FIG. 8B illustrates the degree of decrease in the radiant heat during the pyro cleaning mode, as a thickness of an arrow. In FIGS. 8A and 8B, the variable layer includes a thermochromic material having a phase transition temperature in the temperature range of the pyro cleaning mode.

Therefore, because the phase transition of the variable layer does not occur in the cooking mode which is driven at a lower temperature than the pyro cleaning mode, the visible light transmittance may be increased and thus a user can check the inside of the cooking chamber from the outside. On the other hand, because the phase transition of the variable layer occurs in the pyro cleaning mode, the electrical conductivity of the variable layer increases and the heat reflective performance increases, and thus the visible light transmittance decreases and the heat reflective performance increases.

Figure 9:
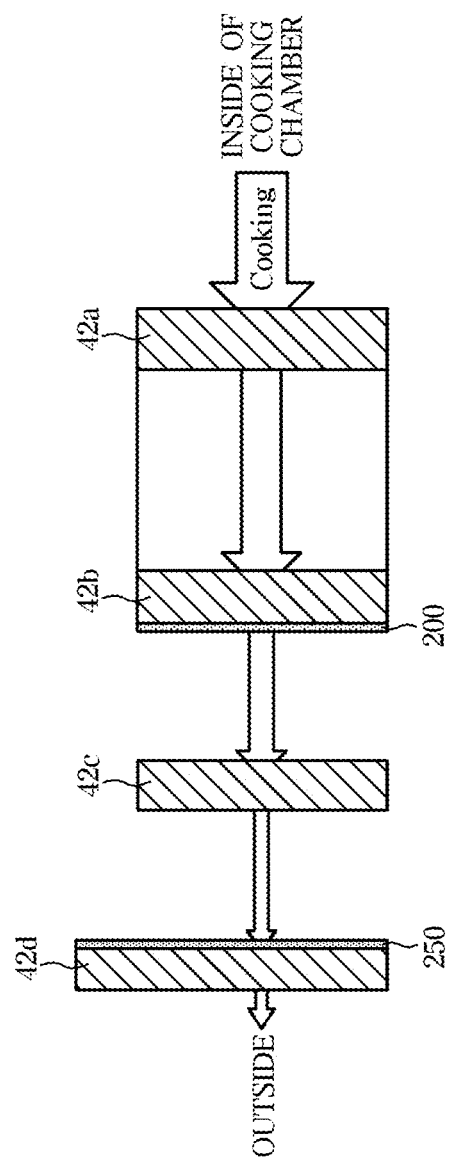
FIG. 9 is a view illustrating a state in which a phase transition occurs in the variable layer according to an embodiment of the disclosure, according to a temperature.
Figure 10:
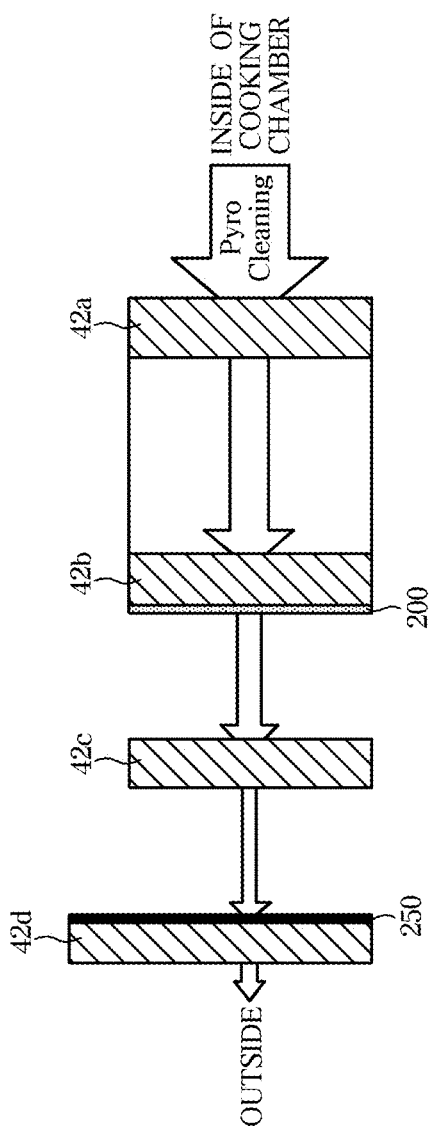
FIG. 10 is a view illustrating a state in which a phase transition occurs in the variable layer according to an embodiment of the disclosure, according to a temperature.

A door of FIGS. 9 and 10 illustrating an example 1 includes a fourth glass 42d on which a variable heat reflective coating layer 250 including a heat reflective coating layer corresponding to a soft coating layer using silver and a variable layer including mg-doped $VO_2$ (Tc≈50° C.) are formed, and a second glass 42b on which only the heat reflective coating layer 200 corresponding to a soft coating layer using silver is formed.

In a comparative example 1, only the heat reflective coating layer 200 corresponding to a soft coating layer using silver is formed on both the fourth glass 42d and the second glass 42b.

FIG. 9 illustrates the cooking mode, FIG. 10 illustrates the pyro cleaning mode, and a table 2 below shows the visible light transmittance and the maximum temperature of the outer surface of the door in each mode of the comparative example 1 and the example 1.

TABLE 2

| | Operation mode | Door visible light transmittance | Maximum temperature of outer surface |
|---|---|---|---|
| Comparative example 1 | Cooking mode | 46% | 40° C. |
| | Pyro cleaning mode | 46% | 72° C. |
| Example 1 | Cooking mode | 39% | 38° C. |
| | Pyro cleaning mode | 12% | 57° C. |

First, in the cooking mode, the visible light transmittance of the door of the example 1 is lower than that of the comparative example 1, but this reduction does not affect a user checking the inside of the cooking chamber and there is no significant difference in the outside temperature of the door. That is, it can be seen that the visibility toward the inside of the cooking chamber is secured in the cooking mode.

In the pyro cleaning mode, the visible light transmittance of the door is reduced, while the temperature of the outer surface of the door is greatly reduced from 72 degrees to 57 degrees. It can be seen that the heat reflective performance is improved in the pyro cleaning mode in which the visibility inside the cooking chamber is not required.

Figure 11:
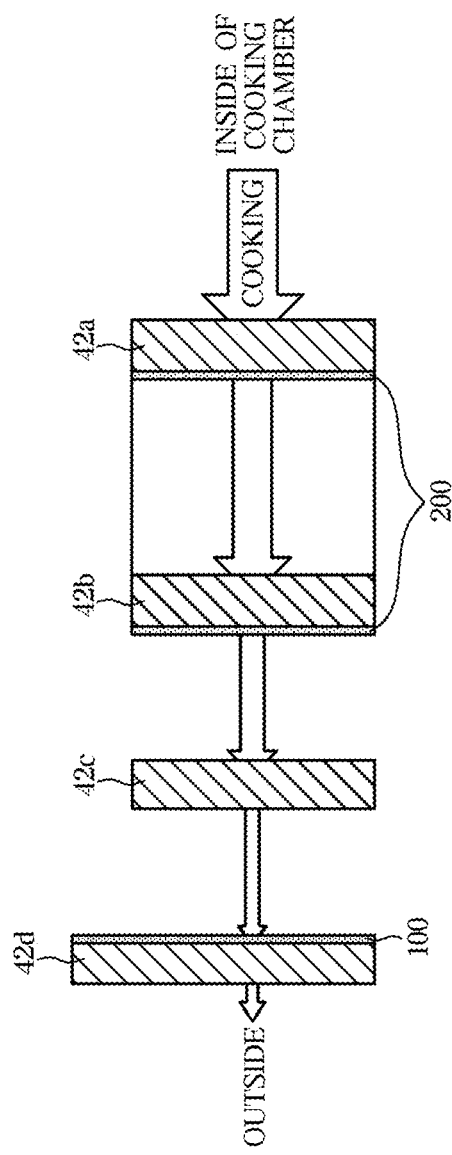
FIG. 11 is a view illustrating a state in which a phase transition occurs in the variable layer according to an embodiment of the disclosure, according to a temperature.
Figure 12:
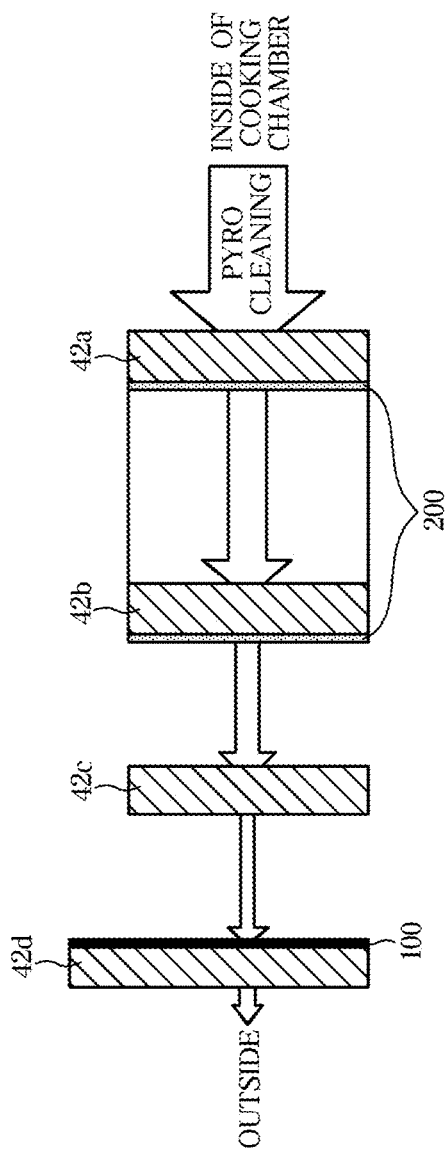
FIG. 12 is a view illustrating a state in which a phase transition occurs in the variable layer according to an embodiment of the disclosure, according to a temperature.

A door of FIGS. 11 and 12 illustrating an example 2 includes a fourth glass 42d on which only a variable layer 100 including mg-doped $VO_2$ (Tc≈50° C.) is formed without the heat reflective coating layer, which is different from the example 1, and a first glass 42a and a second glass 42b on which only a heat reflective coating layer 200 corresponding to a soft coating layer using silver is formed.

In a comparative example 2, only the heat reflective coating layer 200 corresponding to a soft coating layer using silver is formed on both a first glass 42a and a second glass 42b, but neither the heat reflective coating layer nor the variable layer is formed on a fourth glass 42d.

FIG. 11 illustrates the cooking mode, FIG. 12 illustrates the pyro cleaning mode, and a table 3 below shows the visible light transmittance and the maximum temperature of the outer surface of the door in each mode of the comparative example 2 and the example 2.

TABLE 3

| | Operation mode | Door visible light transmittance | Maximum temperature of outer surface |
|---|---|---|---|
| Comparative example 2 | Cooking mode | 46% | 42° C. |
| | Pyro cleaning mode | 46% | 76° C. |
| Example 2 | Cooking mode | 42% | 41° C. |
| | Pyro cleaning mode | 10% | 62° C. |

First, in the cooking mode in the example 2, the visible light transmittance of the door is lower than that of the comparative example 1, but this reduction does not affect a user checking the inside of the cooking chamber, and there is no significant difference in the outside temperature of the door. That is, it can be seen that the visibility toward the inside of the cooking chamber is secured in the cooking mode.

In the pyro cleaning mode, the visible light transmittance of the door is reduced, while the temperature of the outer surface of the door is greatly reduced from 76 degrees to 62 degrees. It can be seen that the heat reflective performance is improved in the pyro cleaning mode in which the visibility inside the cooking chamber is not required.

That is, according to an embodiment, it can be seen that the visibility of the inside of the cooking chamber is secured in the cooking mode and the heat reflective performance is improved in the pyro cleaning mode, by applying the variable layer 100 to the door glass.

Figure 13:
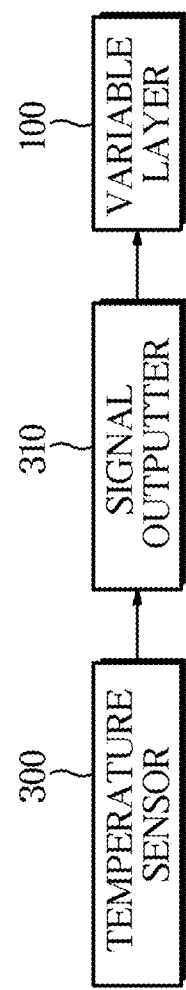
FIG. 13 is a block diagram illustrating the door according to an embodiment of the disclosure.

The variable layer 100 according to an embodiment may include an electrochromic material or a photochromic material in addition to the thermochromic material described above. FIG. 13 illustrates a block diagram of a door when the variable layer 100 according to an embodiment includes an electrochromic material or a photochromic material.

The electrochromic material described above may include $WO_3$, $Nb_2O_5$, $MoO_3$, $TiO_3$, $V_2O_5$, $IrO_2$, NiO, viologen, polypyrrole, PEDOT and polyaniline, and the photochromic material may include spiropyran, spiroxazine, fulguide, chromene, diazo compounds and diarylethene.

When the door according to an embodiment includes the electrochromic material or the photochromic material as a variable layer 100, the door includes a temperature sensor 300 configured to measure a temperature of a glass on which the variable layer 100 is formed, among the plurality of glass sheets forming the door, a signal outputter 310 configured to output an electric signal or an optical signal in conjunction with the temperature sensor 300, and the variable layer 100 in which the visible light transmittance or the heat reflective performance is changed like the above-mentioned thermochromic material, by performing the phase transition according to the signal outputter from the signal outputter 310.

In this case, when the temperature measured by the temperature sensor 300 corresponds to a predetermined temperature such as a temperature of a glass at the time of the pyro cleaning, the signal outputter 310 may output an electrical signal exciting the phase transition of the electrochromic material and an optical signal exciting the phase transition of the photochromic material so as to change the visible light transmittance and the heat reflective performance of the variable layer 100.

That is, the electrochromic material and the photochromic material as well as the thermochromic material may be used to secure the visibility of the cooking chamber in the cooking mode and the heat reflective performance in the pyro cleaning mode as in the above-described embodiments.

As is apparent from the above description, it may be possible to secure a transmittance of a door glass to allow a user to check a cooking object during cooking, by applying a variable layer to the door glass.

During pyro cleaning, it may be possible to improve the heat reflective performance while reducing the transmittance of the glass.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:
   a cooking chamber; and
   a door configured to open and close the cooking chamber and provided with a plurality of glass sheets, the door comprising a variable layer provided on a glass sheet of at least one of the plurality of glass sheets and including a visible light transmittance variable depending on a temperature, wherein the variable layer includes:
   a first variable layer includes $Ti_2O_3$ or $NbO_2$ and is located on a first glass sheet of the plurality of glass sheets that is nearest to an inside of the cooking chamber; and
   a second variable layer includes $VO_2$ and is located on a second glass sheet of the plurality of glass sheets that is nearest to an outside of the cooking chamber.

2. The cooking apparatus of claim 1, wherein the door further comprise a heat reflective coating layer provided on a glass sheet of the plurality of glass sheets.

3. The cooking apparatus of claim 1, wherein the glass sheet having the variable layer further comprise a heat reflective coating layer.

4. The cooking apparatus of claim 3, wherein the heat reflective coating layer comprises:
   a metal layer configured to increase heat reflectivity; and
   a dielectric layer configured to prevent oxidation of the metal layer.

5. The cooking apparatus of claim 4, wherein:
   the metal layer comprises silver; and
   the dielectric layer comprises at least one of SiN or TiN.

6. The cooking apparatus of claim 3, wherein:
   the glass sheet having the variable layer has a first surface and an opposing second surface,
   the variable layer is provided on the first surface, and
   the heat reflective coating layer is provided on the second surface.

7. The cooking apparatus of claim 3, wherein the variable layer and the heat reflective coating layer are provided on one surface of the glass sheet having the variable layer.

8. The cooking apparatus of claim 1, wherein the variable layer comprises an electrochromic material.

9. The cooking apparatus of claim 8, wherein the electrochromic material comprises at least one of $WO_3$, $Nb_2O_5$, $MoO_3$, $TiO_3$, $V_2O_5$, $IrO_2$, NiO, viologen, polypyrrole, PEDOT, or polyaniline.

10. The cooking apparatus of claim 1, wherein the variable layer comprises a photochromic material.

11. The cooking apparatus of claim 10, wherein the photochromic material comprises at least one of spiropyran, spiroxazine, fulguide, chromene, diazo compounds, or diary ethene.

12. The cooking apparatus of claim 1, wherein the door comprises:
   a temperature sensor configured to measure a temperature of at least one of the plurality of glass sheets including the variable layer; and
   a signal outputter configured to output a signal varying the variable layer based on a temperature measured by the temperature sensor reaching a predetermined temperature.

13. The cooking apparatus of claim 12, wherein the variable layer comprises an electrochromic material and a photochromic material.

14. The cooking apparatus of claim 13, wherein the output signal comprises:
   an electrical signal configured to excite a phase transition of the electrochromic material; and
   an optical signal configured to excite a phase transition of the photochromic material.

* * * * *